Oct. 17, 1961 T. G. FARIA 3,005,155
ELECTRIC TACHOMETER WITH VOLTAGE LIMITING MEANS
Filed March 21, 1958 2 Sheets-Sheet 1
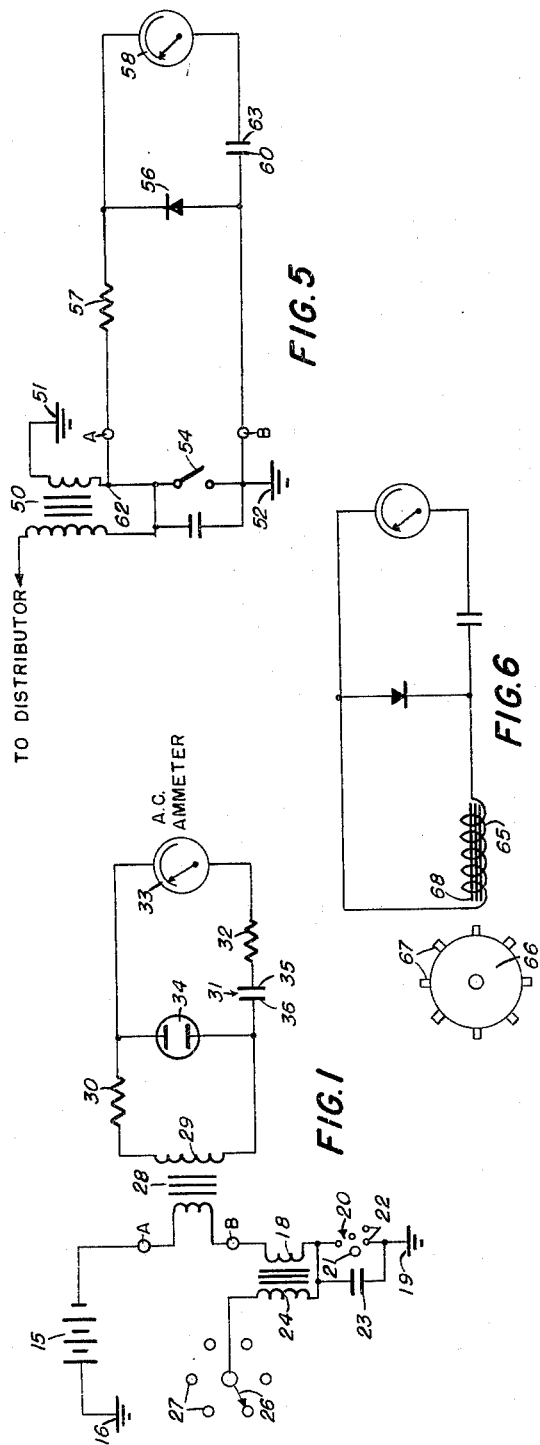
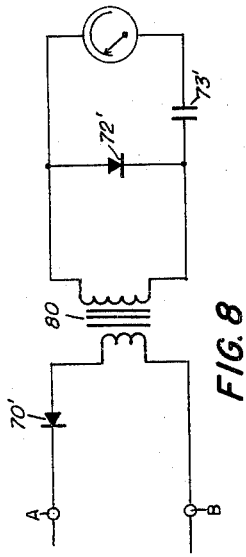
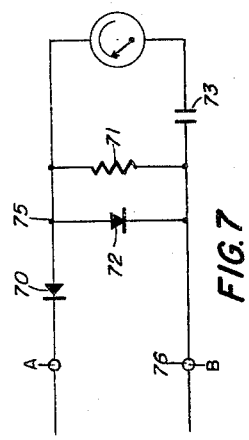
THOMAS G. FARIA
INVENTOR
BY
ATTORNEYS Oct. 17, 1961 T. G. FARIA 3,005,155
ELECTRIC TACHOMETER WITH VOLTAGE LIMITING MEANS
Filed March 21, 1958 2 Sheets-Sheet 2
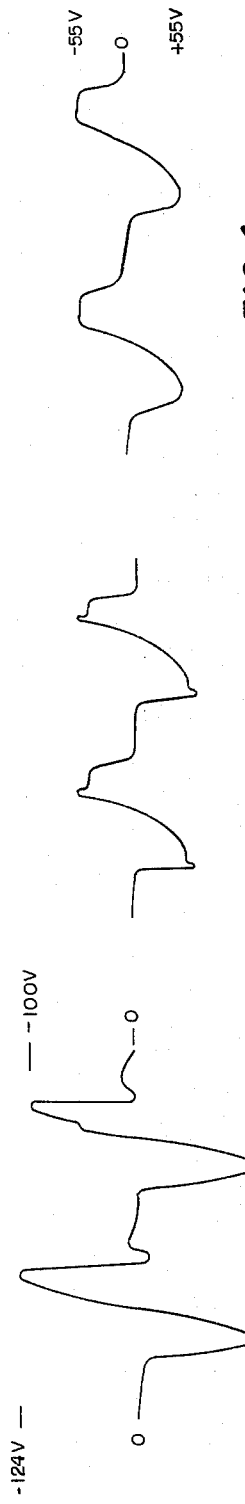
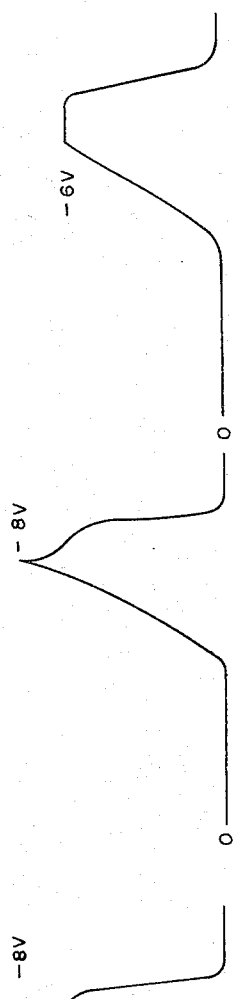
THOMAS G. FARIA
INVENTOR
BY
ATTORNEYS United States Patent Office 3,005,155
Patented Oct. 17, 1961

3,005,155
ELECTRIC TACHOMETER WITH VOLTAGE
LIMITING MEANS
Thomas G. Faria, 13 Joyce Court, Niantic, Conn.
Filed Mar. 21, 1958, Ser. No. 722,974
3 Claims. (Cl. 324—70)

This invention relates to electric tachometers and more particularly to such devices intended principally for measuring the rotative speed of electrically ignited internal combustion engines, but it is not so limited.

It is a general object of the invention to provide a novel and improved tachometer of the type described in which the measuring is effected by the continuous charging and subsequent discharging of a condenser through an alternating current ammeter.

It is another general object of the present invention to provide novel and improved types of electric tachometers capable of a high degree of accuracy resulting from the use of controlled voltages in the measuring circuit whereby fidelity of measurement is independent of speed, pulse voltage and other variable factors.

More particularly it is an object of the invention to improve the accuracy of tachometers of the type described by the use of a voltage limiter to cut-off the condenser charging voltage at a fixed value under all conditions of operation.

A further object of the invention is to provide tachometer circuits incorporating pulse voltage regulating or limiting means together with current summing means for accurate revolution counting and indicating.

Another object of the invention resides in the arrangement of an electric tachometer circuit to be operated by alternating current pulsations which periodically charge a condenser to a fixed potential which is then discharged into an alternating current ammeter whose reading is thus an integration or averaging of the pulse values and may be read in revolutions per minute.

An important object of the invention resides in the provision of means to control the counted and added current pulses to maintain them all at a constant fixed voltage value.

Still another object of the invention consists in the use of a dry contact type of rectifier as a voltage limiter based on its Zener characteristic and/or on its forward characteristics.

A further object of the invention consists in the provision of mechanism to adapt the tachometer for operation from a rotating source.

A still further object of the invention consists in the arrangement for connecting the tachometer for operation from a magneto together with current limiting means to prevent loading the ignition circuit at the time of magneto interrupter opening to thereby prevent misfiring.

Other and further objects and specific features of the invention will be more apparent to those skilled in the art upon a consideration of the following specification and accompanying drawings wherein are disclosed several exemplary embodiments of the invention, with the understanding that such changes and modifications may be made therein as fall within the scope of the appended claims without departing from the spirit of the invention.

In said drawings:

FIG. 1 is a schematic and diagrammatic illustration of an electric tachometer in accordance with one embodiment of the invention shown associated with and energized from a conventional battery, interrupter, spark coil and distributor type of ignition circuit;

FIG. 2 is a reproduction of an oscilloscope photograph of the voltage pulses impressed across the condenser of the tachometer circuit of FIG. 1 with the voltage regulator removed and the resistor between the condenser and meter shortcircuited;

FIG. 3 is a view similar to FIG. 2 but taken with the regulator connected;

FIG. 4 is a view similar to that of FIG. 2 but taken with the circuit intact as shown in FIG. 1;

FIG. 5 is a view similar to FIG. 1 but directed to a tachometer for association with a magneto ignition system;

FIG. 6 is a circuit diagram and schematic of parts therein for a tachometer actuated by a rotating part in the absence of ignition voltage;

FIG. 7 is a view similar to FIG. 5, omitting the magneto showing, and illustrating a modification of the tachometer circuit to prevent undue loading of the ignition circuit;

FIG. 8 is a view similar to FIG. 7 but showing circuit modifications effective when the available ignition circuit primary voltage is too low for effective operation of the tachometer;

FIG. 9 is a reproduction of an oscilloscope photograph of the voltage pulses impressed on the circuit of FIG. 7 from the magneto of an outboard motor;

FIG. 10 is a view similar to FIG. 9 showing the voltage passing the series rectifier with all the remainder of the circuit of FIG. 7 disconnected; and FIG. 11 is a view similar to FIG. 9 showing the voltage across the regulator of FIG. 7.

The advantages of electric tachometers for indicating the speeds of internal combustion engines used for driving automotive vehicles have long been recognized because of the facility with which the indicating instrument may be extended to positions remote from the engine as, for instance, in the pilot house of motor cruisers, aircraft, and the like, by the mere extension of a two-wire circuit rather than the use of a flexible shaft of the type now found on most automobiles. Various other advantages are present in the use of such devices, among which may be mentioned the facility with which the apparatus without mechanical changes can be adapted for use with engines having varying numbers of cylinders. Multiple indicators can also be used very simply.

A further recommendation for apparatus of this type is the facility with which it may use readily available standard parts such as ammeters, condensers, resistors, neon lamps, and the like, without the need for any special parts fabrication.

Reference should now be had to FIG. 1 for a representative arrangement of the parts and circuits for electrically measuring and indicating the rotational speed of a 6-cylinder internal combustion engine having battery, coil and distributor ignition system of the conventional automotive type.

In this figure, 15 is the storage battery of the vehicle having one terminal grounded at 16 and the other connected, through primary 18 of the ignition coil, back to ground 19 through the interrupter 20 which opens and closes the circuit under the action of the 6 lobed cam 21 driven at half crankshaft speed in the usual manner. The interrupter points 22 are bridged by condenser 23 for suppressing the spark and improving the spark intensity. The ignition coil secondary 24 is magnetically coupled to the primary through the usual core and has one end grounded through the interrupter and the condenser, while the other end is connected to distributor arm 26 which makes successive contacts with terminals 27, one for each cylinder, and connected to the spark plugs, respectively, by cables not shown.

This invention adds transformer 28 whose primary is included in series with the primary 18 of the ignition transformer, and has a low impedance winding which is also the case for the step-up secondary winding 29 which is connected through resistor 30, condenser 31 and resistor 32 in series with an alternating current milliammeter 33 of appropriate range. Neon lamp 34 is shunted across the circuit from a point between the resistor 30 and milliammeter 33 and a point between the secondary 29 and the condenser 31 as shown.

In operation, when points 22 close current flows through transformer primary 28 and a high voltage pulse occurs in secondary 29. The neon lamp acts as a voltage regulator and limits the peak of this voltage pulse to a fixed value. Now, assuming that the upper end of the secondary is at a positive potential, current will flow through resistor 30, A.C. milliammeter 33 and resistor 32 to condenser 31 until the latter is charged to the fixed peak voltage at which time current from this pulse will stop flowing in this circuit.

As the voltage across secondary 29 drops lower than the potential of condenser 31 this latter starts to discharge through the closed series circuit shown. Conversely, when the breaker contacts 22 open a voltage pulse of opposite polarity occurs in secondary 29 and its voltage will be limited in the same manner to the same fixed peak value by the voltage regulator 34. Under these conditions current which had already started discharging from plate 35 of condenser 31 will continue to do so and will flow through the secondary and back to plate 36 of the condenser and this will continue until the latter is charged again to the peak voltage. Now, when the voltage across the secondary again begins to drop the condenser will start discharging and the cycle just explained will repeat itself so that the condenser is alternately charged and discharged with a fixed voltage, at the same frequency as the contacts are opened and closed at 22 and the integrated current total flowing to and from condenser 31, which is proportional to this rate, is measured on the A.C. milliammeter 33 which is readily calibrated in revolutions per minute.

The resistor 30 is designed to slightly lower the voltage and improve the regulating action of regulator 34 and can be omitted if the circuit resistance otherwise is sufficient to produce satisfactory regulation. The milliammeter 33 while indicated as an A.C. milliammeter might be replaced by a conventional D.C. milliammeter with dry rectifier.

The resistor 32 introduces some time delay in the charging of condenser 31 and prevents impressing thereon the initial firing voltage of the neon voltage regulator which is substantially higher than the steady regulating voltage thereof. This resistor, like 30, may be omitted if sufficient circuit resistance already occurs or if the type of regulator used does not require a firing voltage higher than normal operating voltage.

Primary of transformer 28 is shown connected in series with that of the ignition coil, but, if suitable means to eliminate oscillatory waves are used, it can be connected across primary 18 or across points 22 or those of a magneto interrupter in a system using that type of ignition.

To facilitate an understanding of the operation of the circuit and, more particularly, that of the highly important voltage regulating device, FIGS. 2, 3, and 4 are reproductions of actual oscilloscope photographs of the voltage pulses impressed across condenser 31 during operation with voltage levels indicated thereon. FIG. 2 illustrates voltage pulses occurring in the series circuit from secondary 29 when voltage regulator 34 is disconnected and resistor 32 is shorted. Here the considerable variation in voltages of the positive and negative phases are noticeable as well as the considerable variation between successive pulses, and these latter may change from time to time as conditions within the several cylinders change, as well as the state of the spark plugs and other components of the high voltage circuit. It will be seen that in the first pulse in FIG. 2 the negative value is greater than the positive, while in the second pulse the reverse is true. If the neon regulator is now restored to the circuit but resistor 32 is still shorted the conditions are much improved as illustrated in FIG. 3 where the voltages may be compared from the scale at the right. The maximum voltages are substantially identical in each phase of each cycle but the small pip at the tip of each pulse indicates a firing voltage which is higher than the steady regulating voltage of the regulator.

Now in FIG. 4 where the circuit is restored to the condition of FIG. 1, the resistor 32 introduces time delay in the charging of the condenser and thus eliminates the firing voltage pips of the regulator so that the condenser is now being charged and discharged with a fixed peak voltage of plus and minus 55 whereby the total current flowing to and from the condenser will be directly proportional to the frequency of the pulses which bear a direct relation to the speed of the engine. The current varies with frequency according to the formula $I = 4fCE$, where $I$ is in amperes, $C$ is in farads, $E$ is in volts, and $f$ is in cycles per second, which latter is one half the number of cylinders in the engine times the revolutions per second for 4-cycle engines.

As an example of the values of the respective components in the circuit, it may be noted that a workable device for a 4,000 r.p.m. 6-cylinder engine tachometer may be as follows:

| | |
|---|---|
| Transformer 28 | Primary 8 turns. Secondary 3100 turns. |
| Resistor 30 | 4700 ohms. |
| Neon voltage regulator 34 | Type 991. |
| A.C. ammeter 33 | 0–1 D.C. milliammeter with bridge rectifier. |
| Resistor 32 | 12000 ohms. |
| Condenser 31 | .025 microfarads. |

The tachometer is calibrated by comparison with a known accurate one by changing the strength of the magnet in the milliammeter until correct reading is obtained.

The embodiment of FIG. 5 while primarily intended for use with engines having magneto ignition, essentially of the outboard motor type, is not so restricted and nothing in the circuit prevents it from use in the manner of FIG. 1. In FIG. 5, 50 is the magneto coil, the primary circuit being grounded at 51 and again at 52 through the interrupter points 54, constituting the usual magneto ignition system. The tachometer circuit is shown as connected across the contacts 54 but, as previously pointed out, it may be shunted across the primary of magneto coil 50 without any tangible different results. This circuit, rather than using the neon voltage regulator of FIG. 1, makes use of a voltage regulator diode 56 (for instance, of silicon) connected in a closed circuit about the breaker points 54 through resistor 57. This voltage regulator limits the peak of the voltage pulse to a fixed value due to its Zener characteristics. Such characteristics provide for a substantially constant lower voltage in the reverse direction after a break-down voltage is reached.

A series circuit comprising milliammeter 58 and condenser 60 is connected and shunted to the regulator 56 so that the circuit will be seen to be not substantially different from that of FIG. 1, except for the use of a different type of voltage regulator and the absence of a resistor in the milliammeter circuit. To understand the operation, assume that a voltage pulse with a positive polarity at point 62 results from the operation of the points 54 so that current from the magneto coil flows through resistor 57, A.C. milliammeter 58 and condenser 60 until this condenser is charged to the fixed peak voltage at which time current will stop flowing. Now, when the magneto coil voltage begins to drop condenser 60 starts to discharge and current flows through the milliammeter and resistor 57 to the magneto coil.

With the first positive pulse, the voltage applied to milliammeter 58 is limited to a fixed value, which is repetitive as the motor operates, by the voltage regulator diode, and this fixed value assures accurate operation. However, when the voltage in the magneto coil reverses in polarity a pulse will again be impressed across the voltage regulator diode 56 but will be limited to an extremely low fixed value by the forward regulating action of the voltage regulator diode. Thus current which had already started flowing from plate 63 of condenser 60 on its discharge following the positive pulse will continue until the condenser is discharged, the rate of the latter action being speeded by the subsequent closing of contacts 54.

It will thus be evident that the condenser is charged and discharged with a fixed voltage from the magneto at the same rate as this latter is energized, and the current to the condenser is proportional to the rate since the voltage is fixed and is measured by the A.C. milliammeter 58 which is calibrated in r.p.m. The purpose of the resistor 57 is to reduce the loading effect of the tachometer circuit on the ignition system while at the same time improving the regulating action of voltage regulator 56 which can, of course, be replaced with other types of rectifiers which provide voltage regulation because of their forward characteristics. To further improve the voltage regulating action the resistor 57 may be replaced with any well-known form of current regulator such as certain high-voltage low-current lamps.

FIG. 6 shows the tachometer circuit of FIG. 5 modified for use where no potential source, such as that from an ignition coil or magneto, is available. A source is thus provided here by using a magnetic pick-up coil 65 which is capable of measuring the r.p.m. of any rotating part of magnetic material having projections or a configuration capable of inducing electric pulses in the coil by moving to change the magnetic circuit thereof. Thus a rotating disc 66 provided with projecting tips 67 uniformly spaced thereabout may be driven by any machine whose r.p.m. it is desired to measure and these tips may pass close to the end of the core 68 of winding 65 which is connected to the circuit of FIG. 5 in place of the interrupter 54. Such a device may be used in an automobile as a speedometer when the disc 66 is driven by a rotating part whose speed is proportional to road speed. Obviously the pick-up coil can be replaced by other types of transducers. The operation is similar to that described in connection with FIG. 5 for the pulses from coil 65 are alternatively positive and negative as the magnetic field builds up and then collapses.

In FIG. 7 it will be seen that the tachometer circuit is very similar to that illustrated in FIG. 5 and may be used, of course, with battery or magneto ignition devices to energize it. The manner of connection is obvious by comparison with that figure. In this arrangement the rectifier 70 is poled to block the voltage pulse which occurs when the contacts of the ignition circuit open and thereby eliminates loading this latter circuit and causing misfiring. The added resistor 71 paralleling the voltage regulator 72 allows the condenser 73 to discharge after having been charged to the fixed peak voltage regulated by 72. This type of discharge device is necessary because the presence of rectifier 70 would otherwise prevent discharge through the windings of the magneto or other type of ignition circuit.

In operation a positive pulse which occurs when the contacts open is blocked by rectifier 70 so that no voltage reaches the counting circuit, but when a negative voltage pulse occurs the rectifier 70 conducts, voltage regulator 72 limits the pulse to a fixed value, and condenser 73 is charged to this value. As the voltage starts to return to zero the condenser discharges through resistor 71. Obviously resistor 71 may be eliminated if there is enough leakage either in rectifier 70 or in voltage regulator 72 to permit discharge of the condenser within the brief period available therefor.

For a further understanding of the operation of FIG. 7 reference should be had to FIGS. 9, 10, and 11, again representing photographic reproductions of oscillograms taken during the operation of such a circuit when energized by the voltage from an outboard motor magneto connected in the manner illustrated in FIG. 5 or the alternative method explained in connection with the description of that figure. In FIG. 9 is illustrated the voltage from the outboard motor magneto disconnected from the tachometer circuit and the positive and negative pulses with the high peaks are clearly evident. FIG. 10 is the result of a measurement taken between points 75 and 76 in FIG. 7 with all of the parts to the right of the rectifier 70 disconnected. This illustrates that the purpose of the rectifier is fulfilled by suppressing the first half or positive phase of the wave. What remains is identical with the negative half shown in FIG. 9. In FIG. 11 is illustrated the result of the regulator 72 being connected in the circuit, for here the peak of the wave shown in FIG. 10 has been suppressed and the vertical height thereof has been regulated to a —6 volt value. Thus the condenser is charged at a fixed voltage and the current varies with frequency according to the formula $I = 2fCE$, where $I$ is in amperes, $C$ is in farads, $E$ is in volts, and $f$ is in cycles per second, which latter is the number of cylinders in the engine times the revolutions per second for 2-cycle engines or one half the number of cylinders times the revolutions per second for 4-cycle engines.

FIG. 8 represents a modification intended for use where the voltage available from the primary ignition circuit is too low for satisfactory operation of the tachometer circuit. This device may be substituted for the circuits of FIGS. 1, 5, and 7 if the circles designated A and B thereon are connected to those of corresponding designation in these circuits. This circuit is substantially identical with FIG. 7 except for the introduction of transformer 80 which steps up the voltage for the tachometer circuit. The resistor shown at 71 in FIG. 7 is unnecessary in FIG. 8 because the secondary of transformer 80 forms a closed circuit for discharging the condenser $73^1$ since the rectifier $70^1$ has been transferred to the primary side of transformer 81. This rectifier $70^1$ may be replaced by an inductance or a resistor as in FIG. 5 or eliminated completely if the transformer 80 has sufficient resistance or impedance to minimize loading of the ignition circuit.

The invention has been illustrated in several embodiments but it will be appreciated that they have common characteristics forming the generic features of the invention.

I claim:

1. An electric tachometer for the magneto ignition circuit of an outboard motor including in combination, a magneto primary circuit having an interrupter, a circuit shunting said interrupter having in series a transformer primary and a rectifier poled to block the voltage pulse when the interrupter opens; a secondary for said transformer; a voltage regulator shunting said secondary and a series circuit including an A.C. milliammeter and a condenser shunting said regulator; said milliammeter being graduated in revolutions per minute.

2. An electric tachometer for the magneto ignition circuit of an outboard motor including in combination, a magneto primary circuit having an interrupter, a circuit shunting said interrupter having in series a rectifier poled to block the voltage pulse when the interrupter opens and a voltage regulator; a series circuit shunting said regulator and including a condenser and an A.C. milliammeter; said voltage regulator being shunted by an impedance sized to discharge said condenser between pulses.

3. An electric tachometer adapted for connection into the primary circuit of an ignition system, said primary circuit providing pulsations of alternating direction, irregular form and of a variable amplitude, the frequency of the pulsations bearing a direct relation to the speed to be measured, comprising in combination, a transformer having a primary connected in series with all components in said ignition primary circuit and comprising the sole addition thereto, a secondary for said transformer connected in a closed circuit including an A.C. milliammeter adapted to measure current pulses in said closed circuit and show the effective sum thereof, a condenser connected in series with said milliammeter; and a single means only in parallel to both said secondary and said condenser-milliammeter series, said means comprising a diode having Zener characteristics and connected to regulate the maximum voltage amplitude applied to said milliammeter to a uniform value for each pulsation in one direction by said Zener characteristic and in the other direction by its forward regulating action.

References Cited in the file of this patent

UNITED STATES PATENTS

| | | |
|---|---|---|
| 2,108,014 | Jones | Feb. 8, 1938 |
| 2,751,553 | McEntee | June 19, 1956 |
| 2,773,238 | Petroff | Dec. 4, 1956 |
| 2,819,442 | Goodrich | Jan. 7, 1958 |
| 2,839,725 | Haas | June 17, 1958 |
| 2,915,648 | Chudleigh | Dec. 1, 1959 |
| 2,958,038 | Kwast | Oct. 25, 1960 |

FOREIGN PATENTS

| | | |
|---|---|---|
| 1,084,265 | France | Jan. 18, 1955 |